United States Patent
Kim

(10) Patent No.: US 11,903,009 B2
(45) Date of Patent: Feb. 13, 2024

(54) METHOD AND DEVICE FOR SELECTING CHANNEL IN WIRELESS COMMUNICATION SYSTEM

(71) Applicant: Samsung Electronics Co., Ltd., Suwon-si (KR)

(72) Inventor: Myeongyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 17/041,389

(22) PCT Filed: Mar. 18, 2019

(86) PCT No.: PCT/KR2019/003102
§ 371 (c)(1),
(2) Date: Sep. 24, 2020

(87) PCT Pub. No.: WO2019/190099
PCT Pub. Date: Oct. 3, 2019

(65) Prior Publication Data
US 2021/0014870 A1  Jan. 14, 2021

(30) Foreign Application Priority Data
Mar. 26, 2018 (KR) .................. 10-2018-0034349

(51) Int. Cl.
*H04W 72/542* (2023.01)
*H04W 24/08* (2009.01)

(52) U.S. Cl.
CPC ......... *H04W 72/542* (2023.01); *H04W 24/08* (2013.01)

(58) Field of Classification Search
CPC .................... H04W 72/085; H04W 24/08
See application file for complete search history.

(56) References Cited

U.S. PATENT DOCUMENTS 9,294,950 B2   3/2016  Futaki et al.
2009/0080499 A1  3/2009  Yavuz et al.
2010/0279619 A1  11/2010  Yeh et al.
(Continued)

FOREIGN PATENT DOCUMENTS

KR   10-2009-0079176 A   7/2009
KR   10-2010-0075523 A   7/2010
(Continued)

OTHER PUBLICATIONS

International Search Report and Written Opinion of the International Searching Authority in connection with International Application No. PCT/KR2019/003102 dated Jun. 25, 2019, 15 pages.
(Continued)

*Primary Examiner* — Faruk Hamza
*Assistant Examiner* — Alan L Lindenbaum

(57) ABSTRACT

The present disclosure relates to a method of for operating a first base station in a wireless communication system, the method comprising receiving, from an information providing server, information related to an available frequency band, measuring a channel quality of each of a plurality of frequencies in the available frequency band, and determining an operation frequency based on the channel quality of each of the plurality of the frequencies.

10 Claims, 14 Drawing Sheets

(56) References Cited

U.S. PATENT DOCUMENTS

| | | | |
|---|---|---|---|
| 2012/0282940 A1 | 11/2012 | Hosono et al. | |
| 2013/0170362 A1* | 7/2013 | Futaki | H04W 24/10 370/241.1 |
| 2014/0226632 A1* | 8/2014 | Han | H04W 48/16 370/332 |
| 2015/0049720 A1* | 2/2015 | Negus | H04W 72/541 370/329 |
| 2015/0126201 A1* | 5/2015 | Beppler | H04W 36/0079 455/444 |
| 2015/0382367 A1 | 12/2015 | Yanover et al. | |
| 2019/0132776 A1* | 5/2019 | Markwart | H04W 36/0072 |
| 2019/0215698 A1* | 7/2019 | Balachandran | H04W 88/12 |

FOREIGN PATENT DOCUMENTS

| | | |
|---|---|---|
| KR | 10-2010-0094961 A | 8/2010 |
| KR | 10-1574801 B1 | 12/2015 |
| WO | 2017186294 A1 | 11/2017 |
| WO | 2017195152 A1 | 11/2017 |

OTHER PUBLICATIONS

Notice of Preliminary Rejection dated Mar. 31, 2023, corresponding to Korean Application No. 10-2018-0034349, 16 pages.
Office Action dated Oct. 30, 2023, in connection with Korean Patent Application No. KR10-2018-0034349, 26 pages.

\* cited by examiner

METHOD AND DEVICE FOR SELECTING CHANNEL IN WIRELESS COMMUNICATION SYSTEM

CROSS-REFERENCE TO RELATED APPLICATIONS

This application is a 371 National Stage of International Application No. PCT/KR2019/003102, filed Mar. 18, 2019, which claims priority to Korean Patent Application No. 10-2018-0034349, filed Mar. 26, 2018, the disclosures of which are herein incorporated by reference in their entirety.

BACKGROUND

1. Field

The present disclosure generally relates to a wireless communication system, and more particularly, to a method and an apparatus for channel selection in the wireless communication system.

2. Description of Related Art

Federal communications commission (FCC) of the United States has designated 3.5 GHz, that is, the band of 3550 through 3700 MHz as a shared frequency, and named a service provided by this band as a citizens broadband radio service (CBRS) in April 2015. The FCC divided use authorization of this band into three tiers in April 2016. The first tier of the three tiers is a military radar and a satellite as incumbent access, the second tier is a person authorized to access through bidding as priority access, and the third tier is general access where every FCC-approved device is available without an access cost. Among them, CBRS alliance was established in 2016 and is working on rapid commercialization of a long term evolution (LTE) based solution within the CBRS. The present disclosure relates to a method for effectively operating cellular communication including the LTE in the CBRS band.

The CBRS band is the frequency of the 3.5 GHz shared spectrum in the United States, and the frequency band ranges from 3550 MHz to 3700 MHz. A technique for controlling a user of the first tier with a priority, a technique for ensuring the access of a user of the second tier other than the first tier, and an access technique of the third tier are under discussion.

The LTE technology to use in the CBRS band uses orthogonal frequency division multiple access (OFDMA), and frequency operation of multiple cells uses a frequency reuse factor 1. There is interference between multiple users in a cell in a multi-cell environment and accordingly a call quality or a reception rate varies depending on the cell area. However, the frequency band available in the CBRS band is 150 MHz, and this frequency may be used without multi-cell interference but there is no method for utilizing it. In addition, if multiple channels are distributed and operated among base stations without the multi-cell interference, the base station may not easily perform neighbor cell detection and may be limited in mobility which is an advantage of the cellular communication including the LTE.

SUMMARY

Based on the discussions described above, the present disclosure provides a method and an apparatus for effectively selecting a channel in a wireless communication system.

In addition, the present disclosure provides a method and an apparatus for performing communication with a high throughput without multi-cell interference in operating multiple channels in a wireless communication system.

In addition, the present disclosure provides a method and an apparatus for performing handover by changing a frequency according to a frequency use condition of a neighbor cell even if multiple channels are operated by multiple cells in a wireless communication system.

According to various embodiments of the present disclosure, a method for operating a first base station in a wireless communication system is provided. the method comprises receiving, from an information providing server, information related to an available frequency band, measuring a channel quality of each of a plurality of frequencies in the available frequency band, and determining an operation frequency based on the channel quality of each of the plurality of the frequencies.

According to various embodiments of the present disclosure, a method for operating a management server in a wireless communication system is provided. The method comprises receiving, from a first base station, first information comprising a cell identifier and an operation frequency of the first base station, receiving, from at least one second base station connected to the management server, second information comprising a cell identifier and an operation frequency of the at least one second base station, generating a first neighbor cell list based on the second information, and transmitting, to the first base station, the first neighbor cell list.

According to various embodiments of the present disclosure, a first base station in a wireless communication system is provided. The first base station comprises a transceiver and at least one processor, wherein the at least one processor is configured to receive, from an information providing server, information related to an available frequency band, measure a channel quality of each of a plurality of frequencies in the available frequency band, and determine an operation frequency based on the channel quality of each of the plurality of the frequencies.

According to various embodiments of the present disclosure, a management server in a wireless communication system is provided. The management server comprises a transceiver and at least one processor, wherein the at least one processor is configured to receive, from a first base station, first information comprising a cell identifier and an operation frequency of the first base station, receive, from at least one second base station connected to the management server, second information comprising a cell identifier and an operation frequency of the at least one second base station, generate a first neighbor cell list based on the second information, and transmit, to the first base station, the first neighbor cell list.

A method and an apparatus according to various embodiments of the present disclosure, may enable a base station to effectively select a channel in a wireless communication system.

Effects obtainable from the present disclosure are not limited to the above-mentioned effects, and other effects which are not mentioned may be clearly understood by those skilled in the art of the present disclosure through the following descriptions.

DETAILED DESCRIPTION

Terms used in the present disclosure are used for describing particular embodiments, and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

Various embodiments of the present disclosure to be described below describes a hardware approach as an example. However, since the various embodiments of the present disclosure include a technology using both hardware and software, various embodiments of the present disclosure do not exclude a software-based approach.

Hereafter, the present disclosure relates to a method and an apparatus for supporting optimal channel selection and handover in a wireless communication system. Specifically, the present disclosure explains a technique for performing communication without multi-cell interference in operating frequencies of multiple cells in a multi-channel environment of a shared spectrum in the wireless communication system.

Terms indicating signals, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standard (e.g., 3rd generation partnership project (3GPP)), which are merely exemplary for explanations. Various embodiments of the present disclosure may be easily modified and applied in other communication systems.

Figure 1:
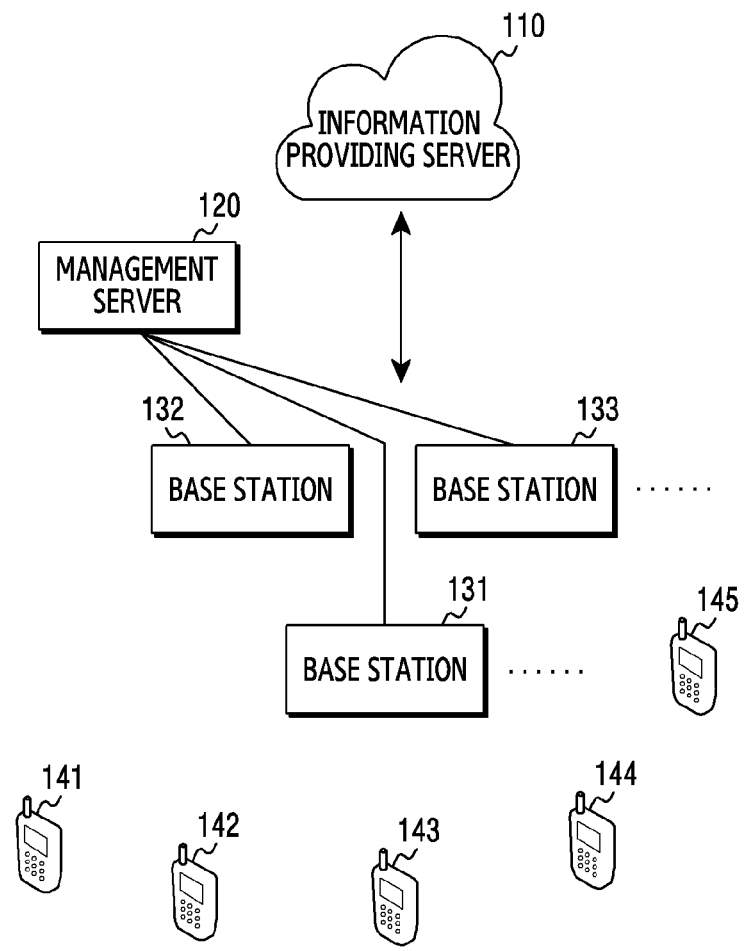
FIG. 1 illustrates a wireless communication system according to various embodiments of the present disclosure.

FIG. 1 illustrates a wireless communication system according to various embodiments of the present disclosure.

FIG. 1 illustrates an information providing server 110, a management server 120, base stations 131, 132, and 133, and terminals 141, 142, 143, 144, and 145, as some of nodes which use a radio channel in the wireless communication system. While FIG. 1 depicts only one information providing server, one management server, three base stations, and five terminals, other entities identical or similar to the information providing server 110, the management server 120, the base stations 131, 132, and 133, and the terminals 141, 142, 143, 144, and 145 may be further included.

The base stations 131, 132, and 133 are a network infrastructure for providing radio access to the terminals 141, 142, 143, 144, and 145. The base stations 131, 132, and 133 have coverage defined as a specific geographical area based on a signal transmission distance. The base stations 131, 132, and 133 may be referred to as, besides the base station, an 'access point (AP)', an 'eNodeB (eNB)', a '5th generation node (5G node)', a 'wireless point', a 'transmission/reception point (TRP)', a cell, a macro cell, a femto cell, a small cell, or other term having technically identical meaning. The base station may provide the radio access according to one or more wireless communication protocols, for example, 5G 3GPP new radio (NR), long term evolution (LTE), LTE-advanced (LTE-A), high speed packet access (HSPA), Wi-Fi 802.11a/b/g/n/ac and the like. For convenience, the terms 'base station' and 'cell' are interchangeably used in this patent document to indicate network infrastructure components which provide the radio access to a remote terminal.

The terminals 141, 142, 143, 144, and 145 each are a device used by a user, and communicate with the base stations 131, 132, and 133 over a radio channel. In some cases, at least one of the terminals 141, 142, 143, 144, and 145 may operate without user's involvement. That is, at least one of the terminals 141, 142, 143, 144, and 145 is a device which performs machine type communication (MTC), and may not be carried by the user. The terminals 141, 142, 143, 144, and 145 each may be referred to as, besides the terminal, a 'user equipment (UE)', a 'mobile station', a 'subscriber station', a 'remote terminal', a 'wireless terminal', or a 'user device', or other term having a technically equivalent meaning.

The information providing server 110 manages availability of a frequency band used by the wireless communication system of the present disclosure. Herein, the frequency band includes a shared spectrum available by other system as well as the wireless communication system according to various embodiments. Hence, if occupied by other system, at least part of the frequency band may not be used by the wireless communication system according to various embodiments. For example, if each of the base stations 131, 132, and 133 requests the information providing server 110 to determine the availability of the frequency band, the information providing server 110 may determine an available frequency band within the managed frequency band, and then transmit information related to the available frequency band to each of the base stations 131, 312, and 133. For example, the information related to the available frequency band is information indicating a channel not used by other system, and may include at least one of a bitmap, an index for the corresponding channel, and a frequency for the corresponding channel.

According to an embodiment, the frequency band used by the wireless communication system of the present disclosure may vary in an access priority according to authorization of the base stations 131, 132, and 133 in the base stations 131, 132, and 133. In this case, the information providing server 110 may determine the available frequency band based on the authorization of the base stations 131, 132, and 133, and then transmit information related to the available frequency band determined for the base stations 131, 312, and 133.

According to another embodiment, the information providing server 110 may transmit to each of the base stations 131, 312, and 133 a message that a specific frequency band managed by the information providing server 110, for example, 150 MHz of 3550 through 3700 MHz is fully available.

According to another embodiment, the information providing server 110 may predetermine the available frequency band of the base stations 131, 132, and 133, and then transmit information related to the determined available frequency band to each of the base stations 131, 132, and 133 if the base stations 131, 132, and 133 requests to determine the availability of the frequency band.

According to an embodiment, the management server 120 may be referred to as an element management system (EMS). The management server 120 receives frequency assignment (FA) information collected by each of the base stations 131, 132 and 133 from each of the base stations 131, 132 and 133, and transmits the FA information of a neighbor cell to each of the base stations 131, 132 and 133. In addition, the management server 120 prioritizes and transmits a neighbor cell in close proximity based on a location obtained using a global positioning system (GPS) to the base stations 131 and 132 and 133.

According to an embodiment, the base stations 131, 132, and 133 may be referred to as citizens broadband radio service devices (CBSDs). Each of the base stations 131, 132, and 133 determines its FA, and collects neighbor cell information at a specific frequency using a terminal within its coverage among the terminals 141, 142, 143, 144, and 145. Herein, the neighbor cell information may include a detection report of the neighbor cell and a measurement report (MR) on the quality of the detected neighbor cell. The measurement report may include information relating to the quality such as received signal strength indicator (RSSI). In addition, the base stations 131, 132, and 133 each may share their FA information through an X2 interface.

As described with reference to FIG. 1, the frequency band used according to various embodiments may be shared by a plurality of systems. In addition, there may be a separate entity which provides the availability information on the frequency band used according to various embodiments. That is, various embodiments to be described may be shared by a plurality of systems, and may be implemented for a frequency band in which the separate entity providing the availability information exists. As an example of the frequency band having such characteristics, the frequency band of the CBRS of the United States may be used. Detailed descriptions on the CBRS are shown in FIG. 2.

Figure 2:
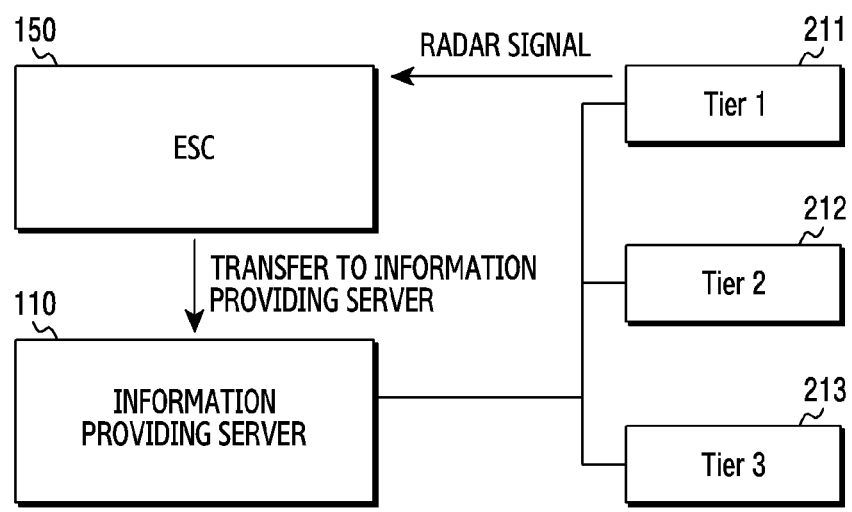
FIG. 2 illustrates operations of environmental sensing capability (ESC) and an information providing server in a wireless communication system according to various embodiments of the present disclosure.

FIG. 2 illustrates operations of environmental sensing capability (ESC) and an information providing server in a wireless communication system according to various embodiments of the present disclosure.

According to various embodiments of the present disclosure, the frequency band used by the wireless communication system of FIG. 1 may be referred to as a CBRS band, and may be the frequency band of 3550~3700 MHz. According to an embodiment, the wireless communication system of FIG. 2 may divide the band use authorization into three first through third tiers 211, 212, and 213. Herein, the first tier 211 is used for an incumbent access (IA) user such as a defense radar, the second tier 212 is a priority access (PA) user who obtains the access priority through bidding, and the third tier 213 is used for a general authorized access (GAA) user.

According to various embodiments of the present disclosure, the frequency band used by the wireless communication system of the present disclosure, for example, the CBRS band is not dedicated to a specific cellular communication system, for example, to the LTE, but is allocated as the shared spectrum excluding the first tier 211. In addition, the frequency band used by the wireless communication system of the present disclosure, for example, the CBRS band differs in the access priority between users of the second tier 212 and the third tier 213 in the specific cellular communication system. Accordingly, it is necessary for at least one central server to allocate the frequency first to the user of the high tier, or to manage to enable the access based on the priority. Hence, the frequency band used by the wireless communication system of the present disclosure, for example, the CBRS band is the shared spectrum but there is an entity which manages the frequency band availability. Such an entity is the information providing server 110 to be described.

The wireless communication system of FIG. 2 illustrates a multi-channel environment of the shared spectrum. The wireless communication system of FIG. 2 illustrates ESC 150, an information providing server 110, and users 211, 212, and 213 per tier as some of nodes which use a wireless channel.

According to an embodiment, the information providing server 110 may be referred to as a spectrum access system (SAS). The information providing server 110 allocates the frequency band for each tier by determining whether the frequency band is available. For doing so, the information providing server 110 operates by receiving information related to a use signal of the first tier 211, for example, a radar signal, from the ESC 150. Specifically, the ESC 150 receives the radar signal from the user of the first tier and thus detects whether the radar signal is on or off, and then transmits information relating to the state of the radar signal to the information providing server 110. The information providing server 110 determines whether the frequency allocated to the first tier 211 in use is available based on the state information of the received radar signal, and allocates the available frequency band other than the frequency allocated to the first tier 211 in use per tier. That is, the information providing server 110 may determine the frequency availability by considering whether the frequency allocated to the first tier 211 is available with respect to the frequency to be used by a small cell, that is, the base station, the access priority of the small cell inquiring about whether to use the frequency, and so on.

According to various embodiments of the present disclosure, the procedure of FIG. 2 is exemplary. Hence, in some cases, the information providing server 110 may notify the small cell, that is, the base station that a specific band, for example, 150 MHz of 3550 through 3700 MHz is fully available as the frequency band used by the wireless communication system of the present disclosure, for example, the CBRS band. Thus, according to an embodiment, if selecting the frequency to use in the small cell and inquiring of the information providing server 110, if the frequency to use in the small cell is within the specific band, the information providing server 110 may approve that the frequency inquired to the small cell is available.

Figure 3:
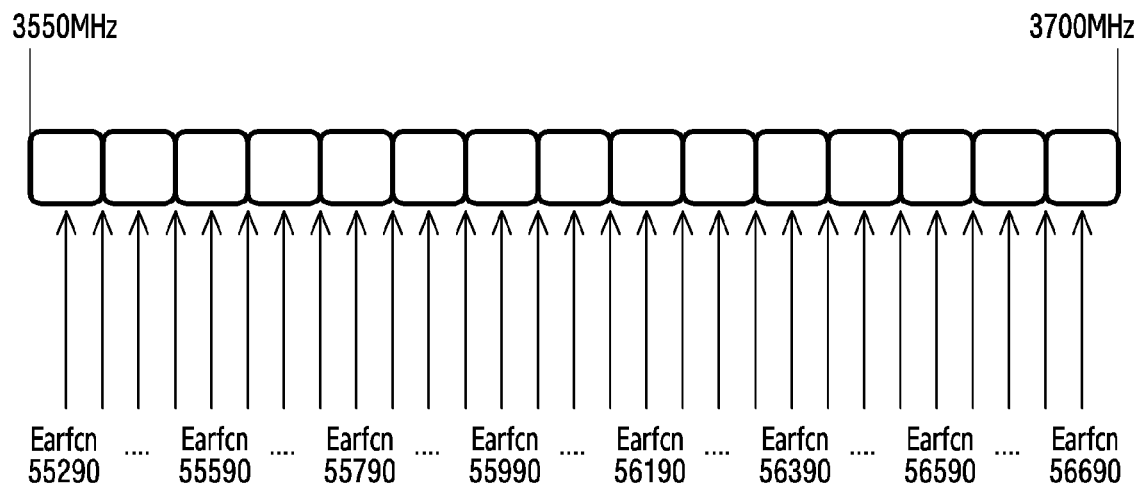
FIG. 3 illustrates operable frequency management of a shared spectrum in a wireless communication system according to various embodiments of the present disclosure.

FIG. 3 illustrates operable frequency management of a shared spectrum in a wireless communication system according to various embodiments of the present disclosure. Specifically, the frequency band of FIG. 3 is a frequency band managed by the information providing server 110 and indicates the frequency band used by the wireless communication system of the present disclosure, for example, the CBRS band.

Each evolved absolute radio frequency channel number (Efcfc) indicates an LTE band number. The case of B48 is the frequency band used by the wireless communication system of the present disclosure, for example, the CBRS band. Earfcn 55290 is the start of 3550 MHz. Earfcn 1 indicates 100 kHz. The operable frequency unit is 5 MHz which is a base unit of general authorized access (GAA). Referring to FIG. 3, the frequency band is managed as the frequency band unit having Earfcn 55290, 55390, 55490, 55590, 55690, 55790, 55890, 55990, 56090, 56190, 56290, 56390, 56490, 56590, and 56690 values as the center FA.

Figure 4:
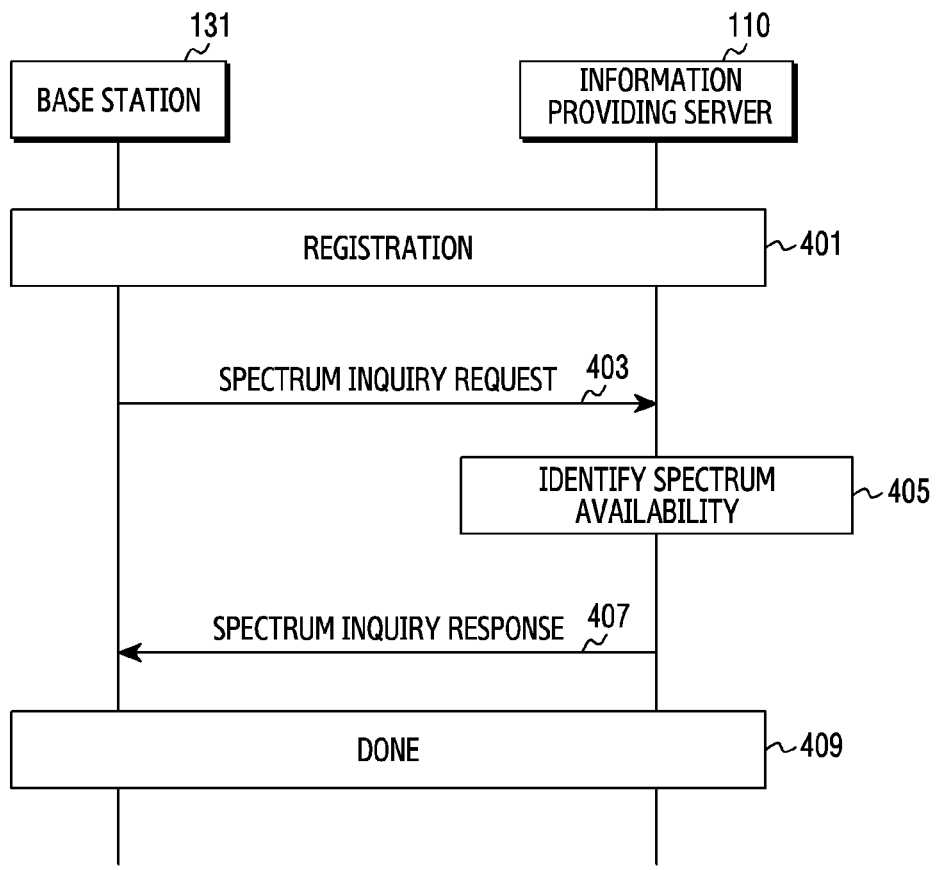
FIG. 4 illustrates operations of a base station and an information providing server in a wireless communication system according to various embodiments of the present disclosure.

FIG. 4 illustrates operations of a base station and an information providing server in a wireless communication system according to various embodiments of the present disclosure.

In FIG. 4, the base station 131 performs the following procedure with the information providing server 110 to identify an available frequency in the frequency band used by the wireless communication system of the present disclosure, for example, the CBRS band.

Referring to FIG. 4, in step 401, the base station 131 registers at the information providing server 110. According to an embodiment, the base station 131 may be newly installed, as a small cell, by a provider. Thus, the registration of step 401 is to inform the information providing server 110 that the base station 131 is newly installed by the provider and will use the frequency band managed by the information providing server 110.

In step 403, the base station 131 transmits a spectrum inquiry request, that is, a request for identifying spectrum availability, to the information providing server 110. Herein, the request for identifying the spectrum availability is for the base station 131 to request information related to the available frequency band in the frequency band used by the wireless communication system of the present disclosure, for example, the CBRS band. According to an embodiment, identifying the spectrum availability means the request of the frequency band information not included the first tier 211 being used in the frequency band used by the wireless communication system of the present disclosure, for example, the CBRS band and available to the base station 131 as the second tier 212 or the third tier 213. According to another embodiment, identifying the spectrum availability means the request for the frequency band information to which the base station 131 has priority and access according to the authority of the base station 131. According to another embodiment, identifying the spectrum availability means the request for identifying whether the frequency band used by the wireless communication system of the present disclosure is fully available.

In operation 405, the information providing server 110 identifies the spectrum availability in response to the spectrum query request of the base station 131. According to an embodiment, the information providing server 110 identifies the frequency band not included the first tier 211 being used in the frequency band used by the wireless communication system of the present disclosure, for example, the CBRS band and available to the base station 131 as the second tier 212 or the third tier 213. According to another embodiment, the information providing server 110 identifies a frequency band to which the base station 131 has priority and access according to the authority of the base station 131. According to another embodiment, the information providing server 110 identifies whether the frequency band used by the wireless communication system of the present disclosure is fully available.

In step 407, the base station 131 receives a spectrum inquiry response from the information providing server 110. Herein, the spectrum query response includes information related to the frequency band identified by the information providing server 110 to be available to the base station 131 in step 405.

In step 409, the base station 131 finishes the spectrum availability identifying procedure. The base station 131 may perform a procedure for determining a frequency to be used by the base station 131 within the frequency band identified in the availability by the information providing server 110.

Figure 5:
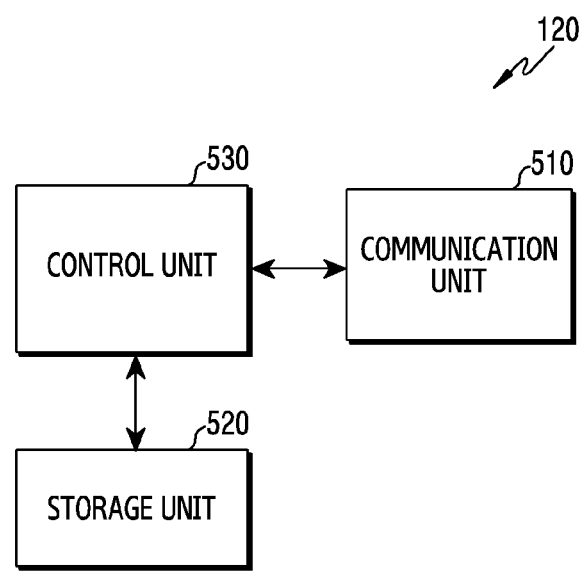
FIG. 5 illustrates a configuration of a management server in a wireless communication system according to various embodiments of the present disclosure.

FIG. 5 illustrates a configuration of a management server in a wireless communication system according to various embodiments of the present disclosure. The configuration illustrated in FIG. 5 may be understood as the configuration of the management server 120. A term such as 'portion' or '~er' used hereafter indicates a unit for processing at least one function or operation, and may be implemented using hardware, software, or a combination of hardware and software. Referring to FIG. 5, the management server 120 includes a communication unit 510, a storage unit 520, and a control unit 530.

The communication unit 510 provides an interface for communicating with other nodes in the network. That is, the communication unit 510 converts a bit string transmitted from the management server 120 to other node, for example, the base stations 131, 132, and 133, to a physical signal, and converts a physical signal received from the other node to a bit string. That is, the communication unit 510 may transmit and receive a signal. Accordingly, the communication unit 510 may be referred to as a modem, a transmitter, a receiver, or a transceiver. At this time, the communication unit 510 enables the management server 120 to communicate with other devices or systems via a backhaul connection (e.g., wired backhaul or wireless backhaul) or over a network.

The storage unit 520 stores a basic program for operating the management server 120, an application program, and data such as setting information. In addition, the storage unit 520 may store FA information collected by the base stations 131, 132, and 133 received from the base stations 131, 132, and 133. The storage unit 520 provides the stored data at a request of the control unit 530.

The control unit 530 controls overall operations of the management server 120. For example, the control unit 530 transmits and receives a signal through the communication unit 510. In addition, the control unit 530 records and reads data in and from the storage 520. For doing so, the control unit 530 may include at least one processor. According to various embodiments, the control unit 530 may control the management server 120 to perform operations according to various embodiments described below.

Figure 6:
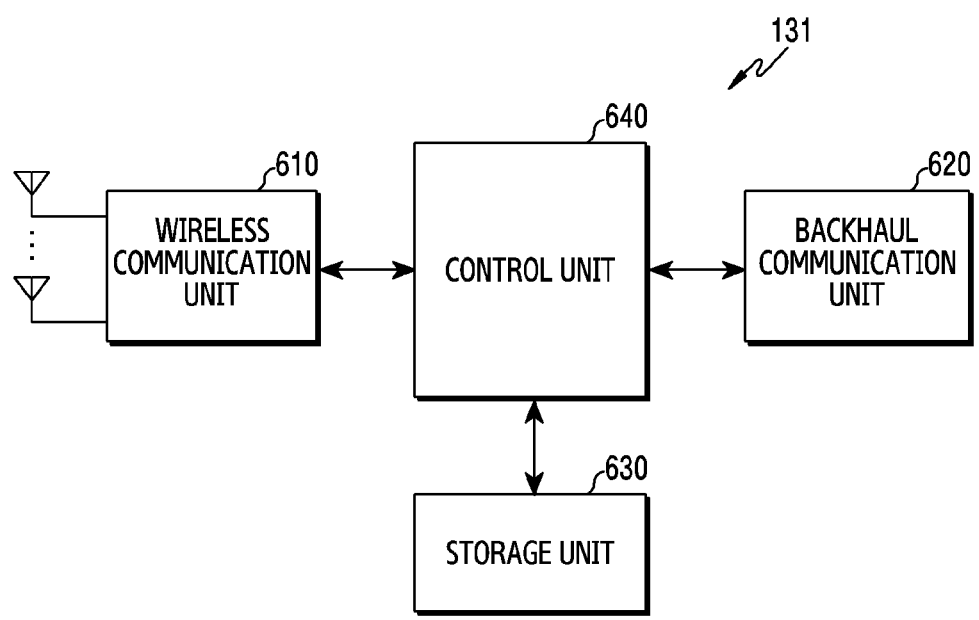
FIG. 6 illustrates a configuration of a base station in a wireless communication system according to various embodiments of the present disclosure.

FIG. 6 illustrates a configuration of a base station in a wireless communication system according to various embodiments of the present disclosure. The configuration illustrated in FIG. 6 may be understood as the configuration of the base station 131. A term such as 'portion' or '~er' used hereafter indicates a unit for processing at least one function or operation, and may be implemented using hardware, software, or a combination of hardware and software. Referring to FIG. 6, the base station 131 includes a wireless communication unit 610, a backhaul communication unit 620, a storage unit 630, and a control unit 640.

The wireless communication unit 610 may perform functions for transmitting and receiving signals over a radio channel. For example, the wireless communication unit 610 performs a conversion function between a baseband signal and a bit string according to a physical layer standard of the system. For example, in data transmission, the wireless communication unit 610 generates complex symbols by encoding and modulating a transmit bit string. Also, in data reception, the wireless communication unit 610 restores a receive bit string by demodulating and decoding a baseband signal. In addition, the wireless communication unit 610 up-converts the baseband signal to a radio frequency (RF) band signal and then transmits it via an antenna, and down-converts an RF band signal received via the antenna to a baseband signal.

For doing so, the wireless communication unit 610 may include a transmit filter, a receive filter, an amplifier, a mixer, an oscillator, a digital to analog convertor (DAC), an analog to digital convertor (ADC), and so on. In addition, the wireless communication unit 610 may include a plurality of transmit and receive paths. Further, the wireless communication unit 610 may include at least one antenna array including a plurality of antenna elements. In terms of the hardware, the wireless communication unit 610 may include a digital unit and an analog unit, and the analog unit may include a plurality of sub-units according to an operating power and an operation frequency.

The wireless communication unit 610 transmits and receives the signals as stated above. Hence, whole or part of the wireless communication unit 610 may be referred to as a 'transmitter', a 'receiver', or a 'transceiver'. Also, in the following explanations, the transmission and the reception over the radio channel is used as the meaning which embraces the above-stated processing of the wireless communication unit 610.

The backhaul communication unit 620 provides an interface for communicating with other nodes in the network. That is, the backhaul communication unit 620 converts a bit sting transmitted from the base station to other node, for example, other access node, other base stations 132 and 133, an upper node, or a core network, to a physical signal, and converts a physical signal received from the other node to a bit string.

The storage unit 630 stores a basic program for operating the base station 131, an application program, and data such as setting information. The storage unit 630 may include a volatile memory, a non-volatile memory, or a combination of a volatile memory and a non-volatile memory. The storage unit 630 provides the stored data at a request of the control unit 640.

The control unit 640 controls overall operations of the base station 131. For example, the control unit 640 transmits and receives signals through the wireless communication unit 610 or the backhaul communication unit 620. Also, the control unit 640 records and reads data in and from the storage unit 630. The control unit 640 may execute functions of a protocol stack requested by a communication standard. For doing so, the control unit 640 may include at least one processor.

According to various embodiments, the control unit 640 may control other components to transmit information notifying an indication method for a carrier for uplink control information transmission, and to transmit carrier information for the transmission of the uplink control information according to the indication method. For example, the control unit 640 may control the base station 131 to perform operations according to various embodiments to be explained.

Figure 7:
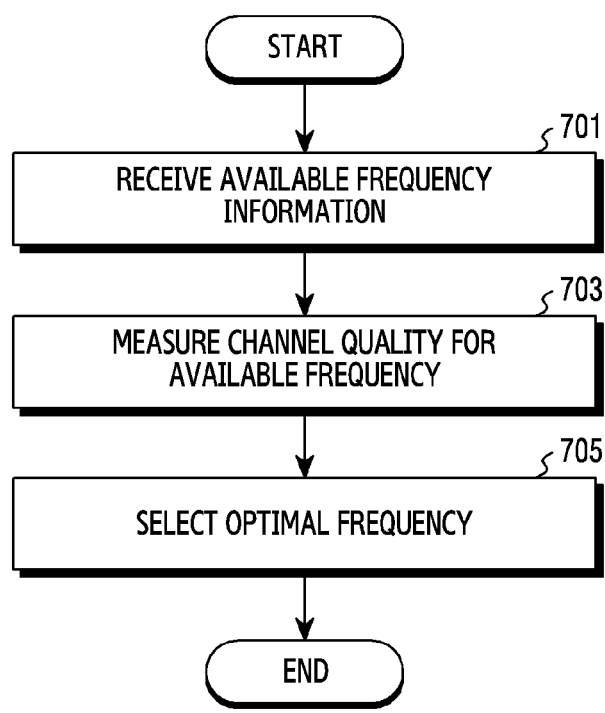
FIG. 7 illustrates a flowchart of a base station in a wireless communication system according to various embodiments of the present disclosure.

FIG. 7 is a flowchart of a base station in a wireless communication system according to various embodiments of the present disclosure. FIG. 7 illustrates an operating method of the base station 131.

Referring to FIG. 7, in step 701, the base station receives information relating to a frequency band available to the base station from the information providing server. According to an embodiment, the information relating to the frequency band available to the base station indicates frequency band information not included in the first tier 211 being used in the frequency band used by the wireless communication system of the present disclosure, for example, the CBRS band and available to the base station 131 as the second tier 212 or the third tier 213. According to another embodiment, the frequency band information available to the base station indicates frequency band information accessible by the base station 131 with priority according to the authority of the base station 131. According to another embodiment, the frequency band information available to the base station indicates information of whether the frequency band used by the wireless communication system of the present disclosure is fully available. The base station may determine which frequency to use in the available frequency band based on the information received from the information providing server.

In step 703, the base station measures a channel quality for the available frequency band. The channel quality may include at least one of RSSI, reference signal received power (RSRP), and signal-to-interference-plus-noise ratio (SINR). According to an embodiment, since the bandwidth of the frequency band used by the wireless communication system of the present disclosure is too wide to be used by one cell (e.g., 150 MHz), the base station measure the channel quality to determine which channel frequency to use. The measurement of the channel quality is performed on the carrier of each channel by dividing to particular frequency bands.

In step 705, the base station may determine an operation frequency based on the channel quality measurement result of step 703. Even based on the same channel quality measurement result, the operation frequency may be determined differently according to the frequency determination criterion. According to an embodiment, the base station may increase through put (TP) by selecting the carrier of the lowest RSSI and thus determining the frequency of least neighbor cell interference as the FA. According to another embodiment, the base station may facilitate handover by determining the same frequency as the FA of the neighbor cell including the FA information in a neighbor cell list of the base station as the FA. According to yet another embodiment, the base station may receive FA mode information for an FA mode set by the provider in the management server, set the FA mode based on the FA mode information, and thus determine the operation frequency according to the criterion set by the provider.

According to an embodiment, since the frequency band used by the wireless communication system of the present disclosure, for example, the CBRS band reaches 150 MHz, it is too wide even if the base station 131 uses 20 MHz for uplink and downlink. Accordingly, what is needed is a procedure for the base station 131 to determine which band of the frequency band identified with the availability from the the information providing server 110 is used. In this respect, the following FIG. 8 illustrates a process for the base station 131 to determine an optimal channel after measuring the channel quality on the basis of 5 MHz with respect to the band identified in the availability by the information providing server 110.

Figure 8:
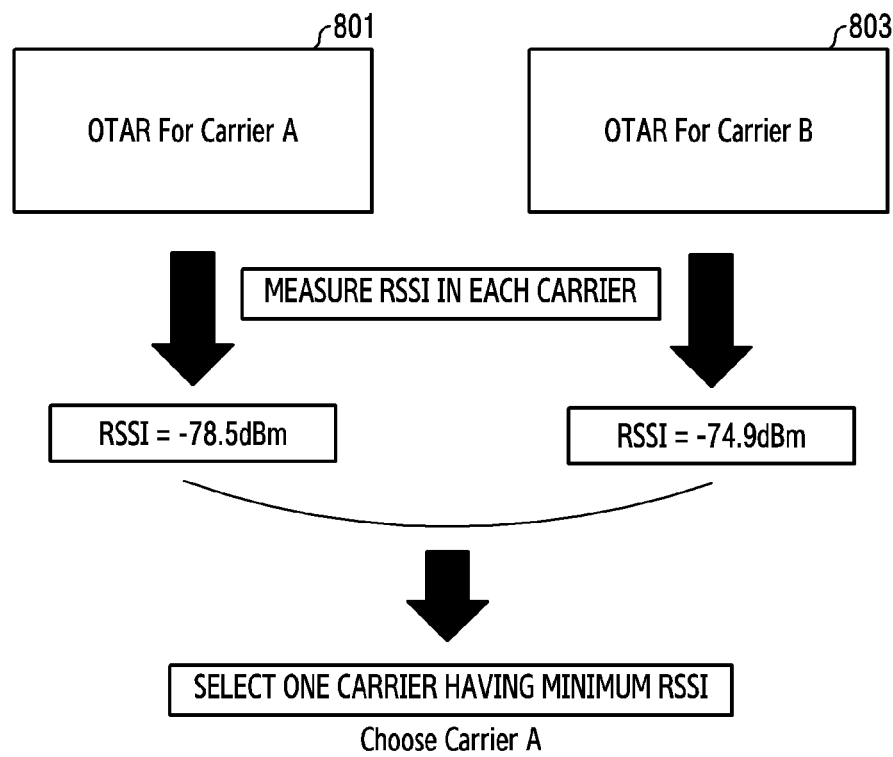
FIG. 8 illustrates optimal channel selection at a base station in a wireless communication system according to various embodiments of the present disclosure.

FIG. 8 illustrates optimal channel selection at a base station in a wireless communication system according to various embodiments of the present disclosure. Specifically, FIG. 8 depicts a specific example for step 705 of FIG. 7.

Referring to FIG. 8, the base station 131 measures the channel quality through an over the air receiver (OTAR) 801 for carrier A and an OTAR 803 for carrier B with respect to the carrier A and the carrier B of the frequency band identified in the availability from the information providing server 110. According to an embodiment, the channel quality may include at least one of RSSI, RSRP, and SINR. The base station 131 selects one carrier based on the measured channel quality. The base station 131 may determine the frequency of the selected carrier as the FA.

According to an embodiment, the base station 131 may configure an available frequency band combination with TDD 5 MHz, 10 MHz, 15 MHz, and 20 MHz. Also, the base station 131 may determine the frequency of the carrier having the least interference as the FA by selecting the carrier of the smallest RSSI in the configured frequency band combination.

According to an embodiment, the base station 131 may determine the FA based on a product of a weight factor and the RSSI measured according to the FA mode preset by the provider in the management server 120. The weight may be applied differently to each carrier according to the FA mode set by the provider.

An example of the FA mode set by the provider may include a TP increase mode, as a first mode, or a handover mode, as a second mode.

The TP increase mode which is the first mode aims to receive the least interference from other cell in the terminal communication.

According to an embodiment, the base station 131 selects the carrier of the smallest RSSI in selecting an initial carrier. Next, the base station 131 may periodically measure the RSSI of each carrier, accumulate the RSSI per carrier measured for a specific number of times, and thus apply a greater weight to a carrier having a smaller accumulation value of the RSSI.

According to an embodiment, if the terminals 141 and 142 determine the frequency not affecting the base station 131 but interfered from the neighbor base stations 132 and 133, they may lower the weight applied to the carrier of the frequency. Specifically, the base station 131 may determine that there is interference from the neighbor base stations 132 and 133 at a specific frequency if the SINR is higher than the RSRP of the terminals 141 and 142 at the specific frequency.

According to an embodiment, if the base station 131 compares the weight for each carrier and there is a carrier having a higher weight than the current carrier, it may change the carrier to the carrier of the higher weight.

The handover mode which is the second mode aims to allow the terminal to perform the handover without changing the frequency and thus facilitate the measurement for the handover. According to the second mode, there is an effect that the provider may conveniently manage the frequency.

According to an embodiment, the base station 131 detects FA information of a neighbor cell in initial FA selection and selects the same frequency as the FA of the neighbor cell as the FA. Herein, the process of the base station 131 for detecting the FA information of the neighbor cell is as follows. The base station 131 receives an ID of the neighbor cell through neighbor cell detection and obtains whether the received neighbor cell ID is in its neighbor cell list. If a single neighbor cell is detected, the same frequency as the FA of the neighbor cell is selected as the FA. If a plurality of neighbor cells is detected, the FA may be determined to the same frequency as the FA of the neighbor cell having the highest RSRP.

According to an embodiment, if there is no neighbor cell to which the base station 131 may handover, the base station 131 may determine the FA to the frequency of the carrier having the smallest RSSI.

According to an embodiment, the base station 131 may increase the weight applied to the same frequency as the FA of the neighbor cell periodically detected by collecting the FA information of the neighbor cell periodically detected. Herein, the base station 131 may differentially increase the weight in descending order of the RSRP of the neighbor cell.

According to an embodiment, if there is no neighbor cell to which the base station 131 may handover, the base station 131 may determine the FA as in the TP increase mode.

According to another embodiment, the FA mode preset by the provider in the management server 120 may include a mixed mode which applies the weight by combining the TP increase mode and the handover mode, besides the TP increase mode or the handover mode. At this time, one or more mixed modes may exist according to a combination ratio of the TP increase mode and the handover mode.

According to various embodiments of the present disclosure, the base station 131 may change the FA to an operation frequency most efficient for the handover by performing the procedure of FIG. 8 if the terminals 141 and 142 connected to the base station 131 perform the handover. Accordingly, the method suggested in the present disclosure may provide an effect of performing the handover by changing the frequency according to the frequency use condition of the neighbor cell even if the handover is performed in operating the multiple channels in the wireless communication system. Further, the method suggested in the present disclosure may provide an effect of performing multi inter-channel handover operating in multiple cells through the frequency change in operating the multiple channels in the wireless communication system.

According to various embodiments of the present disclosure, the base station 131 may perform the RSSI measurement procedure of FIG. 8 every time the FA is changed.

Figure 9:
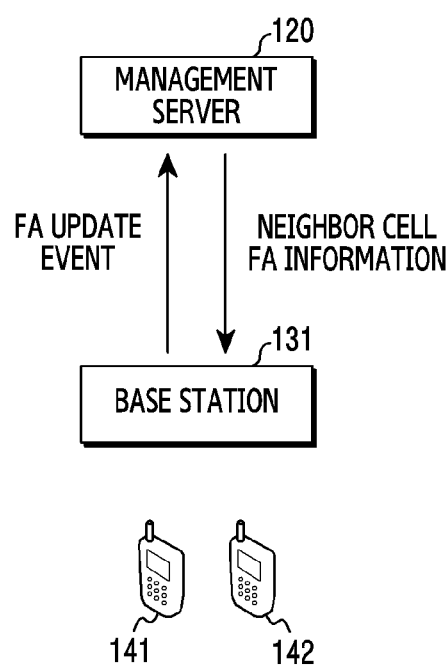
FIG. 9 illustrates signal exchanges between a base station and a management server if a frequency assignment (FA) update event occurs in a wireless communication system according to various embodiments of the present disclosure.

FIG. 9 illustrates signal exchanges between a base station and a management server if a FA update event occurs in a wireless communication system according to various embodiments of the present disclosure.

Referring to FIG. 9, after the base station 131 is newly installed and initially determines the FA through the procedure of FIG. 8, it transmits FA information related to the determined FA to the management server 120 to inform the new installation. The management server 120 may manage the FA information of the connected base stations 131, 132, and 133 by receiving the FA information from the connected base stations 131, 132, and 133.

The base station 131 transmits initial FA information to the management server 120 and then receives a neighbor cell list from the management server 120. The neighbor cell list includes the FA information of the base stations 132 and 133 which are the neighbor cells around the base station 131 among base stations connected to the management server 120. Herein, the FA information may include a cell ID of the neighbor cell and the FA of the neighbor cell. In addition, determining which one of the base stations connected to the management server 120 is the neighbor cell of the base station 131 is performed by the management server 120 based on a position such as GPS.

The base station 131 updates the neighbor cell list after receiving the initial FA information from the management server 120. To update the neighbor cell list, the base station 131 may request the terminals 141 and 142 connected to the base station 131 to detect the neighbor cell and conduct a measurement report on the detected neighbor cell.

Since the neighbor cell detection of the terminals 141 and 142 is manually performed, the base station 131 directs the terminals 141 and 142 to the frequency to detect. According to an embodiment, the frequency band used by the wireless communication system of the present disclosure, for example, the CBRS band reaches 150 MHz and accordingly the base station 131 determines which band combination to detect. Determining the band combination to detect is a problem not considered in the existing cellular communication systems. However, the present disclosure suggests a solution to the problem.

The neighbor cell list of the base station 131 includes the cell IDs and the FA information relating to specific A-ary neighbor cells. The A is smaller than a specific number B for the maximum number of the neighbor cells of which the neighbor cell list may include information. The base station 131 may determine the same A-ary frequency as the FA of the A-ary neighbor cell included in the initial neighbor cell list or a frequency equal to or less than A (e.g., if a plurality of neighbor cells determines the same frequency as the FA) as the frequency to be detected by the terminals 141 and 142. The terminals 141 and 142 detect and measure the neighbor cells at the frequency determined by the base station 131, and then transmit a measurement report to the base station 131. If a new neighbor cell is detected in the received measurement report, the base station 131 updates the neighbor cell list by adding information of the new neighbor cell to the neighbor cell list. Herein, the information of the new neighbor cell may include FA information of the new neighbor cell, that is, a cell ID and FA of the new neighbor cell.

The update of the neighbor cell list of the base station 131 may be performed periodically or aperiodically in some cases. For the periodical update of the neighbor cell list, the base station 131 may direct the terminals 141 and 142 to periodically report the measurement of the neighboring cell. An example of the aperiodic neighbor cell list update includes the handover of the terminals 141 and 142. If determining that the connection strength with the terminals 141 and 142 is decreasing, the base station 131 may determine that the handover is necessary and instruct the terminals 141 and 142 to report the measurement of the neighboring cell.

If obtaining the information of the new neighbor cell based on measurement reports received from the terminals 141 and 142, the the base station 131 may share the neighbor cell list with the new neighbor cell through the X2 interface communication. Alternatively, the base station 131 may share the neighbor cell list through the X2 interface communication periodically or aperiodically with respect to the neighbor cells included in the neighbor cell list. The base station 131 may add information of the neighbor cell list of the neighbor cell received through the X2 interface communication to the neighbor cell list of the base station 131.

The base station 131 may delete FA information of a neighbor cell of which the measurement has has not been reported for a long time from the neighbor cell list based on the measurement report. In some cases, in determining the FA information to delete from the neighbor cell list, the base station 131 may determine to delete the FA information of the neighbor cell of which the measurement has has not been reported for a long time, if the FA information of the neighbor cell of which the measurement is not reported for a long time is included in the neighbor cell list of the neighbor cell received through the X2 interface.

The base station 131 transmits the updated neighbor cell list to the management server 120 every time a change occurs in the FA information included in the neighbor cell list of the base station 131, that is, the neighbor cell ID and the FA.

The number of the neighbor cells included in the neighbor cell list should be less than or equal to the specific number B for the maximum number of the neighbor cells of which the neighbor cell list may include the information. Accordingly, the base station 131 sorts the neighbor cells from which the information received in order of a distance from the base station 131 based on the signal strength, and then includes only the FA information of the B-ary neighbor cells determined to be close to the base station 131 into the neighbor cell list.

However, the base station 131 merely determines the distance to the neighbor cell based on the signal strength, which may be more inaccurate than the determination based on position coordinates such as GPS. Thus, the signal strengths from a plurality of neighbor cells differ by less than a specific threshold and it may be difficult to determine which neighbor cell is closer to the base station 131. In this case, the base station 131 determines that it is necessary to request the FA information of the neighbor cell to the management server 120, and transmits an FA update event message to the management server 120. If receiving the FA update event message from the base station 131, the management server 120 sorts the B-ary or less neighbor cells at the close distance from the base station 131 based on position information such as GPS, and then transmits FA information of the sorted B-ary or less neighbor cells to the base station 131. If receiving the FA information for the B-ary or less neighbor cells from the management server 120, the base station 131 discards the existing neighbor cell list, and generates a new neighbor cell list based on the received FA information of the B-ary or less neighbor cells.

Figure 10:
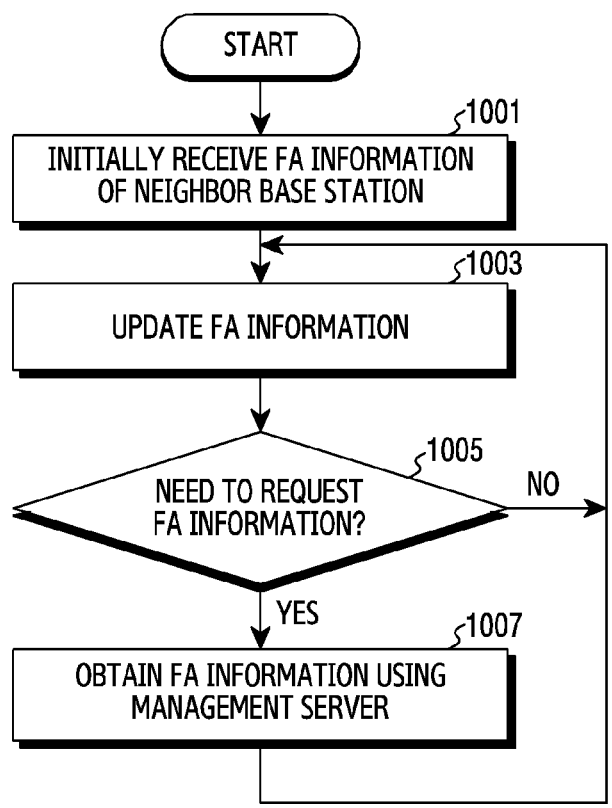
FIG. 10 illustrates a flowchart of a base station in a wireless communication system according to various embodiments of the present disclosure.

FIG. 10 illustrates a flowchart of a base station in a wireless communication system according to various embodiments of the present disclosure.

Referring to FIG. 10, in step 1001, the base station initially receives FA information relating to A-ary neighbor cells from the management server. The base station generates an initial neighbor cell list based on the received FA information of the A-ary neighbor cells.

In step 1003, the base station updates the neighbor cell list of the base station through measurement reports received from terminals connected to the base station or sharing the neighbor cell list with the neighbor cell through the X2 interface. Specifically, the base station adds or deletes the FA information included in the neighbor cell list through the measurement report or the neighbor cell list sharing through the X2 interface. The base station sorts B-ary neighbor cells close to the base station based on the signal strength with the neighbor cell, and then includes only the FA information of the sorted B-ary neighbor cells into the neighbor cell list of the base station. The base station transmits the updated neighbor cell list to the management server every time a change occurs in the FA information included in the neighbor cell list of the base station, that is, the neighbor cell ID and the FA.

In step 1005, the base station determines whether it is necessary to request the FA information of the neighbor cell from the management server. The number of the neighbor cells included in the neighbor cell list should be less than or equal to the specific number B for the maximum number of the neighbor cells of which the neighbor cell list may include the information. Accordingly, the base station sorts the neighbor cells from which the information is received in the distance order from the base station based on the signal strength, and then stores only the FA information of the B-ary neighbor cells determined to be close to the base station in the neighbor cell list. However, the base station merely determines the distance to the neighbor cell based on the signal strength, which may be more inaccurate than the determination based on the position coordinates such as GPS. Thus, the signal strengths from a plurality of neighbor cells differ by less than a specific threshold and thus it may be difficult to determine which neighbor cell is closer to the base station. In this case, the base station determines that it is necessary to request the FA information of the neighbor cell from the management server and performs step 1007. If the signal strengths from the plurality of the neighbor cells differ by more than the specific threshold and determining which neighbor cell is closer to the base station is clear, the base station sorts the B-ary neighbor cells, and then re-performs step 1003 with the neighbor cell list including the FA information of the sorted B-ary neighbor cell.

In step 1007, the base station transmits an FA update event message to the management server, and receives FA information for B-ary or less neighbor cells close to the base station based on GPS equivalent position information from the management server. Next, the base station discards the existing neighbor cell list and generates a new neighbor cell list based on the FA information of the received B-ary or less neighbor cells. The base station re-performs from step 1003 with the new neighbor cell list.

Figure 11:
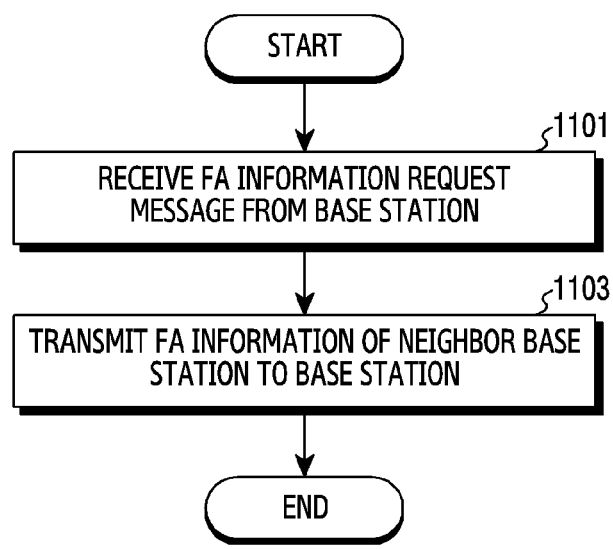
FIG. 11 illustrates a flowchart of a management server in a wireless communication system according to various embodiments of the present disclosure.

FIG. 11 illustrates a flowchart of a management server in a wireless communication system according to various embodiments of the present disclosure.

Referring to FIG. 11, in step 1101, the management server receives an FA update event message from the base station. The FA update event message from the base station requests accurate determination based on the position such as GPS, because determining at the base station the B-ary neighbor cells in the distance order around the base station 13 is inaccurate as the determination based on the signal strength. The management server manages FA information of base stations connected to the management server, and may accurately determine their location based on the GPS of the base stations connected to the management server. Hence, the management server sorts B-ary or less neighbor cells which are close to the base station based on the GPS, in response to the FA update event message from the base station.

In step 1103, the management server transmits to the base station FA information relating to the B-ary or less neighbor cells close to base station sorted in step 1101. If receiving the FA information relating to the B-ary or less neighbor cells from the management server, the base station discards the existing neighbor cell list, and generate a new neighbor cell list based on the received FA information relating to the B-ary or less neighbor cells.

Figure 12:
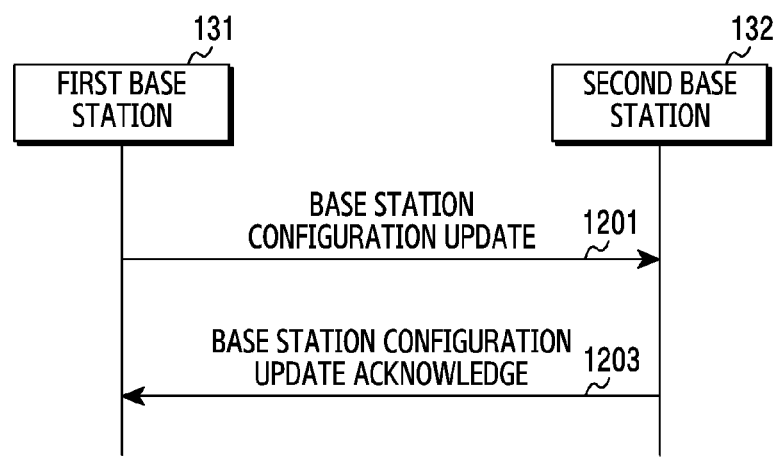
FIG. 12 illustrates signal exchanges between a first base station and a second base station in a wireless communication system according to various embodiments of the present disclosure.

FIG. 12 illustrates signal exchanges between a first base station and a second base station in a wireless communication system according to various embodiments of the present disclosure.

The signal exchanges between the first base station 131 and the second base station 132 of FIG. 12 may be performed through the X2 interface.

The second base station 132 is one of neighbor cells of which FA information is included in the neighbor cell list of the first base station 131. The first base station 131 may obtain the FA information of the second base station 132, that is, the cell ID and the FA of the second base station 132 by initially receiving from the management server 120 in step 1001, by receiving in steps 1007 and 1103, or by receiving the measurement reports from the terminals 141 and 142. The first base station 131 performs the procedure of FIG. 12 for the the neighbor cell list update of the first base station 131.

Referring to FIG. 12, in step 1201, the first base station 131 transmits a base station configuration update message to the second base station 132. The base station configuration update message is for the first base station 131 to request the second base station 132 to transmit the neighbor cell list of the second base station. According to an embodiment, the base station configuration update message may include the neighbor cell list of the first base station 131. In this case, after the procedure of FIG. 12 is finished, the first base station 131 and the second base station 132 may share their neighbor cell list.

In operation 1203, the first base station 131 receives a base station configuration update acknowledgment message from the second base station 132. The base station configuration update acknowledgment message includes the neighbor cell list of the second base station 132 along with an acknowledgment (ACK) for the base station configuration update message. The first base station 131 updates the neighbor cell list of the first base station 131 based on the neighbor cell list of the second base station 132.

According to various embodiments of the present disclosure, the procedure of FIG. 12 may be performed periodically or aperiodically. In the periodic performance, the first base station 131 determines the neighbor cell included in the neighbor cell list of the first base station as the second base station 132 and transmits the base station configuration update message. In addition, in the aperiodic performance, the first base station 131 detects a new neighbor cell, and then determines the new neighbor cell to the second base station 132 and thus transmits the base station configuration update message. The case where the first base station 131 detects the new neighbor cell may include a case where the first base station 131 detects the new neighbor cell based on the measurement report received from the terminals 141 and 142, a case where the first base station 131 detects the new neighbor cell through the neighbor cell list of the third base station 133 received by performing the procedure of FIG. 12 wit the third base station 1333 through the X2 interface, or a case where the first base station 131 detects the new neighbor cell through the FA information relating to the B-ary or less neighbor cells received in step 1007 or step 1103 from the management server 120.

Figure 13:
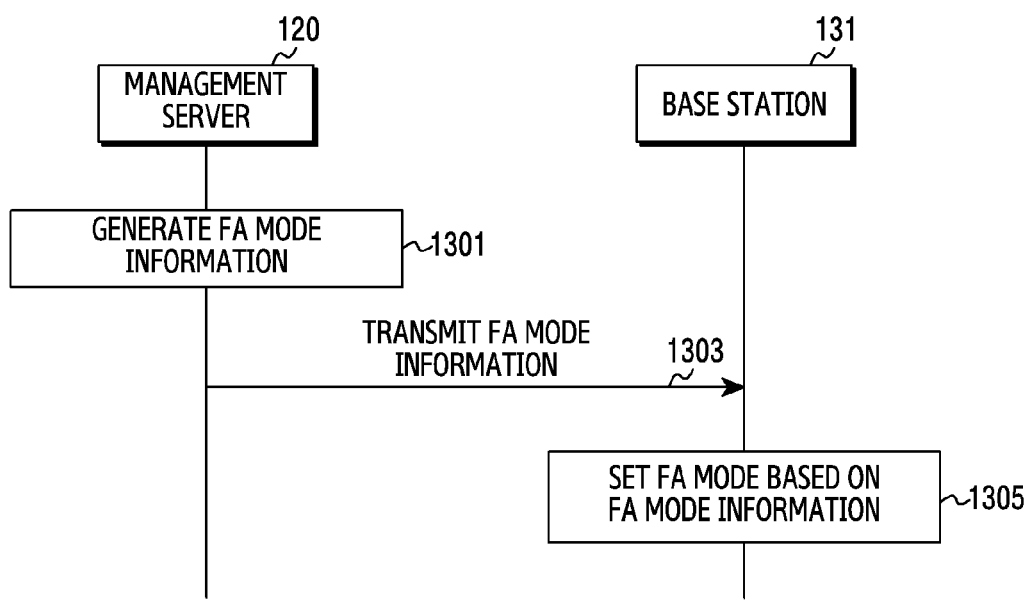
FIG. 13 illustrates signal exchanges between a management server and a base station in a wireless communication system according to various embodiments of the present disclosure.

FIG. 13 illustrates signal exchanges between a management server and a base station in a wireless communication system according to various embodiments of the present disclosure.

FIG. 13 illustrates a procedure in which the base station 131 receives the information relating to the FA mode set by the provider from the management server 120 and thus sets the FA mode of the base station 131.

The FA mode indicates a criterion for determining the FA of the base station 131 in the available frequency band of the base station 131. The FA mode may be preset by the provider in the management server 120 and then transferred from the management server 120 to the base station 131 through the procedure of FIG. 13. The reason why the provider sets the FA mode is for the provider to efficiently provide the service to the terminal user according to the purpose. For example, it is important to increase the throughput if data usage of the terminal is considerable in the cell connected to the management server 120. At this time, the terminal may increase the throughput without interference from the neighbor cell by minimizing the interference of the FA of the plurality of the cells connected to the management server 120. As another example, the measurement report is performed from the terminal every time the handover is performed if the handover of the terminal frequently occurs in the cell connected to the management server 120. In this case, if the FA of the plurality of cells connected to the management server 120 is identical or similar, the terminal may perform the handover without changing the frequency and thus the provider may conveniently manage the frequency.

According to an embodiment, the example of the FA mode which may be set by the provider may include the TP increase mode as the first mode, or the handover mode as the second mode.

The TP increase mode which is the first mode aims to receive the least interference from other cell in the terminal communication.

According to an embodiment, the base station 131 selects the carrier having the smallest RSSI if selecting an initial carrier. Next, the base station 131 periodically measures the RSSI of each carrier and accumulates the RSSI per carrier measured for a specific number of times, and thus apply a greater weight to the carrier having a smaller accumulation value of the RSSI.

According to an embodiment, if determining the frequency not affecting the base station 131 but interfered at the terminals 141 and 142 from the neighbor base stations 132 and 133, the weight applied to the carrier of the frequency may be lowered. Specifically, the base station 131 may determine that there is interference from the neighbor base stations 132 and 133 at a specific frequency if the SINR is higher than the RSRP of the terminals 141 and 142 at the specific frequency.

According to an embodiment, if the base station 131 compares the weight for each carrier and there is a carrier having a higher weight than the current carrier, it may change the carrier to the carrier of the higher weight.

The handover mode which is the second mode aims to allow the terminal to perform the handover without changing the frequency and thus facilitate the measurement for the handover. According to the second mode, there is the effect that the provider may conveniently manage the frequency.

According to an embodiment, the base station 131 detects FA information of a neighbor cell in initial FA selection and selects the same frequency as the FA of the neighbor cell as the FA. Herein, the process of the base station 131 for detecting the FA information of the neighbor cell is as follows: The base station 131 receives an ID of the neighbor cell through the neighbor cell detection and obtains whether the received neighbor cell ID is in its neighbor cell list. If a single neighbor cell is detected, the same frequency as the FA of the neighbor cell is selected as the FA. If a plurality of neighbor cells is detected, the FA may be determined to the same frequency as the FA of the neighbor cell having the highest RSRP.

According to an embodiment, if there is no neighbor cell to which the base station 131 may handover, the base station 131 may determine the FA to the frequency of the carrier having the smallest RSSI.

According to an embodiment, the base station 131 may increase the weight applied to the same frequency as the FA of the neighbor cell periodically detected by collecting the FA information of the neighbor cell periodically detected. Herein, the base station 131 may differentially increase the weight in descending order of the RSRP of the neighbor cell.

According to an embodiment, if there is no neighbor cell to which the base station 131 may handover, the base station 131 may determine the FA as in the TP increase mode.

According to another embodiment, the FA mode preset by the provider in the management server 120 may include the mixed mode which applies the weight by combining the TP increase mode and the handover mode, besides the TP increase mode or the handover mode. In this case, one or more mixed modes may exist according to the combination ratio of the TP increase mode and the handover mode.

Referring to FIG. 13, in step 1301, the management server 120 generates FA mode information based on the FA mode set by the provider. The FA mode information indicates what the FA mode set by the provider is.

In step 1303, the management server 120 transmits the FA mode information to the base station 131. Since the management server 120 needs to transmit the FA mode information to the base station 131 before the base station 131 determines the FA of the base station 131, step 1303 may be performed if the base station 131 is initially installed. The management server 120 may perform step 1303 by transmitting the FA mode information to a new base station every time the new base station is installed and initially connected to the management server 120.

In step 1305, the base station 131 sets the FA mode of the base station 131 based on the received FA mode information. The base station 131 may determine an optimal carrier based on the FA mode set for the carrier of the frequency band identified in the availability from the information providing server 110. Next, the base station 131 may determine the frequency of the determined optimal carrier to the FA.

Figure 14:
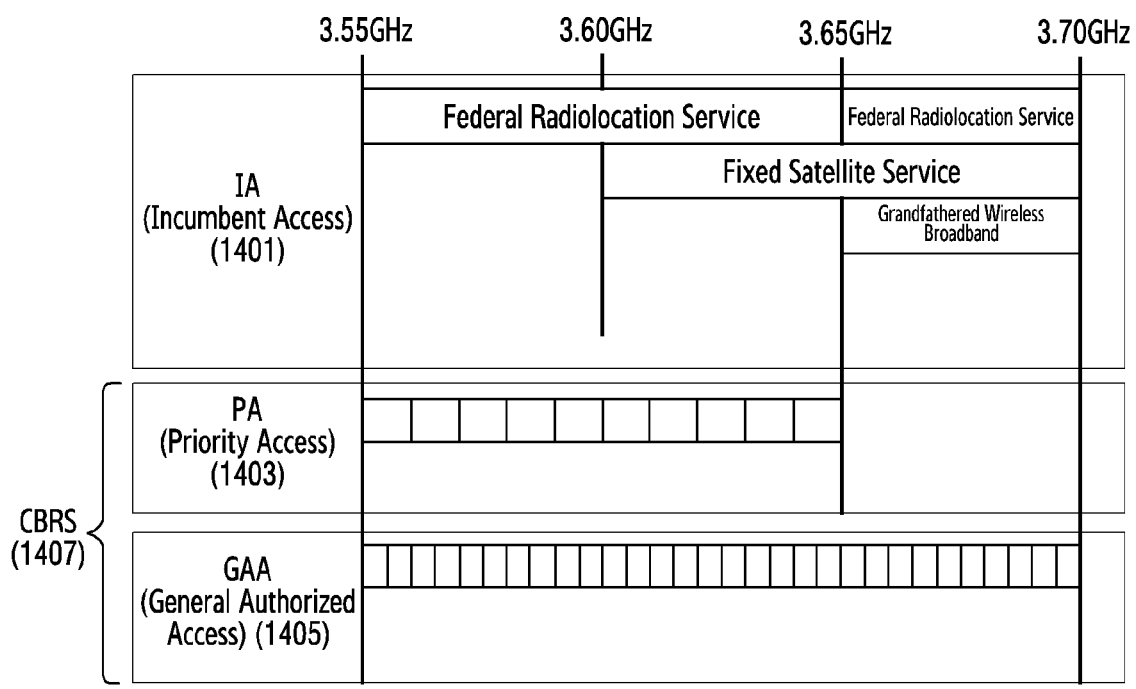
FIG. 14 illustrates setting of an operation frequency in a wireless communication system according to various embodiments of the present disclosure.

FIG. 14 illustrates setting of an operation frequency in a wireless communication system according to various embodiments of the present disclosure.

Referring to FIG. 14, the frequency band used by the wireless communication system of the present disclosure may be the frequency band of 3550~3700 MHz. According to an embodiment, the wireless communication system of FIG. 14 may divide the bandwidth use authorization into three first through third tiers 1401, 1403, and 1405. Herein, the first tier 1401 may be used for the military access user (IA) such as a defense radar, the second tier 1403 may be used for the private user (PA) who obtained the access priority through bidding, and the third tier 213 may be used for the GAA. In addition, the second tier and the third tier available to the PA may be combined and referred to as the CBRS.

According to an embodiment, services provided for the first tier 1401 may include i) a federal radiolocation service provided in the frequency band of 3550~3650 MHz and 3650~3700 MHz, ii) a fixed satellite service (FSS) provided in the frequency band of 3600~3700 MHz frequency, and iii) a grandfathered wireless broadband service provided in the frequency band of 3650~3700 MHz.

i) Federal radio location service includes i-1) a shipborne radar service and a ground-based radar service provided in the frequency band of 3550~3650 MHz, and i-2) the frequency band of 3650~3700 MHz will not be used in future but existing equipment may be operating.

ii) The fixed satellite service may be an available service only for reception in some area where an FSS earth station is installed.

iii) The grandfathered wireless broadband service is used in some regions and may not be available for equipment installation in a new area after April 2016. In addition, the grandfathered wireless broadband service may expire in all licenses from 2020.

According to an embodiment, the second tier 1403 may use 3550~3650 MHz, that is, the frequency band 100 MHz in total. In detail, the second tier 1403 may divide and use the total 100 MHz frequency band into 10 channels by 10 MHz. Yet, only seven channels of the ten channels may be used in one area for the second tier 1403.

According to an embodiment, the third tier 1405 may use 3550~3700 MHz, that is, the frequency band 150 MHz in total. Specifically, the third tier 1405 may divide and use the total 150 MHz frequency band into 30 channels by 5 MHz.

According to various embodiments of the present disclosure, the frequency band used by the wireless communication system of the present disclosure is not dedicated to a specific cellular communication system, for example, the LTE, and may be allocated as the shared spectrum except for the first tier 1401. In addition, the access priority may be different between users of the second tier 1403 and the third tier 1405 with respect to the frequency band specific cellular communication system used by the wireless communication system of the present disclosure. Accordingly, at least one central server needs to allocate the frequency first to the user of the high tier, or manage first for the access. Also, in some cases, it is necessary for at least one central server to manage the allocation criterion of the operation frequency according to a specific criterion set by the user.

According to an embodiment, the base station 131 may determine the operation frequency based on the method of the basic mode, and/or according to an optional FA mode set by the provider in the management server 120.

An example of the method of determining the operation frequency according to the basic mode is as follows.

1. The upper tier has priority over the lower tier according to the rank of the tiers. For example, a channel for guaranteeing quality of service (QoS) is unconditionally assigned to the second tier 1403 over the third tier 1405. Such determination is performed by a QoS class identifier (QCI), and the determination criterion is set to QCI 1~5 such that the channel is allocated to the second tier 1403 over the third tier if there is a bearer.

2. If there is the bearer for guaranteeing the QoS, the second tier 1403 is set to perform the handover over the third tier 1405 even in the handover. Specifically, the method of determining the operation frequency in the handover is as follows.

(1) The base station 131 obtains available frequency information of the second tier 1403 from the information providing server 110.

(2) The base station 131 determines first the frequency obtained the information over a UE measurement configuration channel as the operation frequency.

(3) If the neighbor base stations 132 and 133 has the frequency channel of the second tier 1403, the handover is performed first in the frequency channel. According to an embodiment, a parameter for the handover to the base station or the cell having the frequency channel as the operation frequency may set to be high.

(4) The base station 131 may first determine a target cell to perform the handover as follows.

4-i) The handover is performed first in the channel having the smallest RSSI among the frequency channels of the second tier 1403.

4-ii) The handover is performed for the channel of the next smallest RSSI if load of the frequency channel set in 4-i) is greater than a threshold.

An example of the FA mode which may be set by the provider may include a distributed TP increase mode, a use frequency optimization mode, and a centralized interference control mode. The base station 131 may determine the operation frequency according to the optional FA mode set by the provider in the management server 120. An example of the method for determining the operation frequency according to each FA mode is as follows.

1. An example of the method for determining the operation frequency in the distributed TP increase mode is as follows.

(1) If selecting the initial operation frequency channel, the base station 131 determines the frequency channel of the smallest RSSI value as the operation frequency.

(2) Next, the base station 131 may periodically identify the RSSI value of each channel and increase the weight for the RSSI value with respect to the frequency channel of a small accumulated RSSI value.

(3) The weight for the RSSI value for the frequency channel in which little influence is exerted on the base station 131 but the terminals 141 and 142 are affected by neighbor communication equipment may be lowered.

(4) The base station 131 may compare the weight set for each channel and if there is a channel of a higher weight, change the operation frequency to this channel.

2. An example of the method for determining the operation frequency in the frequency optimization mode is as follows.

(1) If selecting the initial operation frequency channel, the base station 131 obtains FA information of a neighbor cell and determines the same frequency as the FA of the neighbor cell as the operation frequency. In so doing, a process of the base station 131 for obtaining the FA information of the neighbor cell is as follows.

1-1) The base station 131 receives an ID of the neighbor cell, and identifies whether the neighbor cell is included in the neighbor cell list of the base station 131.

1-2) If the base station neighbor cell list includes the neighbor cell of the received ID, the same frequency as the corresponding FA of the neighbor cell of the received ID is determined as the operation frequency if a single neighbor cell receives the ID, and the same frequency as the FA of the neighbor cell having the highest RSRP among a plurality of neighbor cells receiving the the ID is determined as the operation frequency if a plurality of neighbor cells receives the ID.

(2) If there is no neighbor cell available for the handover, the base station 131 determines the frequency channel of the smallest RSSI as the operation frequency.

(3) The base station 131 periodically senses and collects the FA information of the neighbor base station, and may raise the weight for the channel corresponding to the FA of the neighbor base station from which the FA information is collected repeatedly. According to an embodiment, at this time, the weight for the RSSI value may be increased differentially in the descending order of the RSRP of the neighboring base station.

(4) If there is no neighbor cell available for the handover, the base station 131 determines the frequency channel having the small RSSI value, that is, the channel having the least interference as the operation frequency as in the distributed TP increase mode.

3. An example of the method for determining the operation frequency in the centralized interference control mode is shown in the following [Table 1].

TABLE 1

| Order | Entity | Content |
| --- | --- | --- |
| 1 | Base station | Obtains information about base station output, installation location, and antenna height |
| 2 | Base station →Management server | Provides information on base station output, installation location, and antenna height |
| 3 | Management server | Calculation of interference between base stations and calculation of the degree of interference between base stations using a path loss model |
| 4 | Information providing server →Management server | Provide usable band |
| 5 | Management server | After distribution of channels that can be used commonly by all base stations, distribution of additional channels that can be used without interference for each base station |
| 6 | Management server →Base station | Channel assignment |
| 7 | Base station →Information providing server | Request permission to use the channel |
|  | Information providing server →Base station | If there is no interference to IA, PA, channel use authority is granted |

Referring to [Table 1], (1) first, the base station 131 obtains the information such as the output of the base station 131, the installation position of the base station 131 and the antenna height of the base station 131. The output of the base station 131 indicates, for example, equivalent isotropic radiated power (EIRP). The base stations 132 and 133 also perform the same operation.

(2) Next, the base station 131 provides the management server 120 with the information such as the output of the base station 131, the installation position of the base station 131, and the antenna height of the base station 131 obtained in (1). The base stations 132 and 133 also perform the same operation.

(3) Next, the management server 120 calculates the interference between the base stations 131, 132, and 133. According to an embodiment, the management server 120 may calculate interference levels between the base stations 131, 132, and 133 using a path loss model.

(4) Next, the information providing server 110 provides the management server 120 with the available band information.

(5) Next, the management server 120 distributes a channel available to all the base stations 131, 132, and 133 in common, and then distributes an additional available channel without the interference for each of the base stations 131, 132, and 133.

(6) Next, the management server 120 allocates channels to the base stations 131, 132, and 133.

(7) Next, each of the base stations 131, 132, and 133 requests the channel use authorization from the information providing server 110. In this respect, the information providing server 110 grants the channel use authorization if each of the base stations 131, 132, and 133 does not interfere with the first tier 1401 and the second tier 1403. If the channel use authorization is granted from the information providing server 110, each of the base stations 131, 132, and 133 determines the allocated channel as the operation frequency.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for causing the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

In addition, the program may be stored in an attachable storage device accessible via a communication network such as Internet, Intranet, local area network (LAN), wide LAN (WLAN), or storage area network (SAN), or a communication network by combining these networks. The storage device may access the electronic device through an external port. In addition, a separate storage device on the communication network may access the device which fulfills the embodiment of the present disclosure.

In the specific embodiments of the present disclosure, the elements included in the present disclosure are expressed in a singular or plural form. However, the singular or plural expression is appropriately selected according to a proposed situation for the convenience of explanation and the present disclosure is not limited to a single element or a plurality of elements. The elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Thus, the scope of the present disclosure is not limited and defined by the described embodiment and is defined not only the scope of the claims as below and their equivalents.

The invention claimed is:

1. A method performed by a base station in a wireless communication system, the method comprising:
   receiving, from an information providing server managing a shared spectrum, information on an available frequency band of the shared spectrum, wherein the available frequency band includes at least one frequency band which is accessible by the base station with a priority;
   measuring a channel quality for each of the at least one frequency band in the available frequency band; and
   identifying an operation frequency band among the at least one frequency band based on a frequency assignment mode of the base station and the channel quality,
   wherein the frequency assignment mode is configured by the information providing server, and includes a first mode applying a weight value based on a received signal strength indicator (RSSI) value for reducing interference from other cell, a second mode applying a weight value based on a reference signal received power (RSRP) value for performing a handover without changing frequency band, and a third mode applying different weight values based on a combination ratio of the first mode and the second mode, and
   wherein the identifying further comprises:
   selecting, based on the first mode, a frequency band with a lowest RSSI value as the operation frequency band,
   selecting, based on the second mode, a frequency band of a neighbor cell with a highest RSRP value in a neighbor cell list of the base station as the operation frequency band, and
   selecting, based on the third mode, a frequency band corresponding to a largest one of the RSSI value or the RSRP value multiplied by the different weight values based on the combination ratio as the operation frequency band, and
   wherein the selecting, based on the second mode, further comprises:
   receiving, from a management server, information on at least one neighbor cell, and
   updating the neighbor cell list based on the information on the at least one neighbor cell, wherein a number of neighbor cells included in the updated neighbor cell list is less than or equal to a threshold number.

2. The method of claim 1, wherein the identifying further comprises:
   identifying the operation frequency band by applying a weight value to the channel quality for each of the at least one frequency band, and
   wherein the weight value is indicated by a message from the management server.

3. The method of claim 2, further comprising:
   transmitting, to the management server, a cell identifier of the base station and the identified operation frequency band.

4. The method of claim 3, wherein the information on the at least one neighbor cell comprises a cell identifier and an operation frequency band of the at least one neighbor cell of the base station.

5. A first base station in a wireless communication system, the first base station comprising:
   a transceiver configured to transmit or receive a signal; and
   at least one processor coupled with the transceiver and configured to:
   receive, from an information providing server managing a shared spectrum, information on an available frequency band of the shared spectrum, wherein the available frequency band includes at least one frequency band which is accessible by the first base station with a priority,
   measure a channel quality for each of the at least one frequency band in the available frequency band, and
   identify an operation frequency band among the at least one frequency band based on a frequency assignment mode of the first base station and the channel quality,
   wherein the frequency assignment mode is configured by the information providing server, and includes a first mode applying a weight value based on a received signal strength indicator (RSSI) value for reducing interference from other cell, a second mode applying a weight value based on a reference signal received power (RSRP) value for performing a handover without changing frequency band, and a third mode applying different weight values based on a combination ratio of the first mode and the second mode, and
   wherein the at least one processor is further configured to identify the operation frequency band by:
   selecting, based on the first mode, a frequency band with a lowest RSSI value as the operation frequency band,
   selecting, based on the second mode, a frequency band of a neighbor cell with a highest RSRP value in a neighbor cell list of the first base station as the operation frequency band, and
   selecting, based on the third mode, a frequency band corresponding to a largest one of the RSSI value or the RSRP value multiplied by the different weight values based on the combination ratio as the operation frequency band, and
   wherein the selecting based on the second mode further comprises:
   receiving, from a management server, information on at least one neighbor cell, and
   updating the neighbor cell list based on the information on the at least one neighbor cell, wherein a number of neighbor cells included in the updated neighbor cell list is less than or equal to a threshold number.

6. The first base station of claim 5, wherein the at least one processor is further configured to:
   identify the operation frequency band by applying a weight value to the channel quality for each of the at least one frequency band, and
   wherein the weight value is indicated by a message from the management server.

7. The first base station of claim 6, wherein the at least one processor is further configured to:
   transmit, to the management server, a cell identifier of the first base station and the identified operation frequency band.

8. The first base station of claim 7, wherein the information on the neighbor cell comprises a cell identifier and an operation frequency band of the at least one neighbor cell of the first base station.

9. A method performed by a management server in a wireless communication system, the method comprising:
receiving, from a first base station, a cell identifier and an operation frequency band of the first base station;
receiving, from at least one second base station connected to the management server, a cell identifier and an operation frequency band of the at least one second base station; and
transmitting, to the first base station, information on at least one neighbor cell for the first base station, at least one neighbor cell list included in the information on the at least one neighbor cell comprising the cell identifier and the operating frequency band of the at least one second base station,
wherein the operation frequency band of the first base station is identified from an available frequency band of a shared spectrum, the available frequency band including at least one frequency band which is accessible by the first base station with a priority,
wherein the operation frequency band is identified based on a frequency assignment mode of the first base station and a channel quality measured for each of the at least one frequency band,
wherein the frequency assignment mode of the first base station includes a first mode applying a weight value based on a received signal strength indicator (RSSI) value for reducing interference from other cell, a second mode applying a weight value based on a reference signal received power (RSRP) value for performing a handover without changing frequency band, and a third mode applying different weight values based on a combination ratio of the first mode and the second mode,
wherein, based on the first mode, the operation frequency band of the first base station is a frequency band with a lowest RSSI value,
wherein, based on the second mode, the operation frequency band of the first base station is a frequency band of a neighbor cell with a highest RSRP value in the at least one neighbor cell list,
wherein, based on the third mode, the operation frequency band of the first base station is a frequency band corresponding to a largest one of the RSSI value or the RSRP value multiplied by the different weight values based on the combination ratio,
wherein the at least one neighbor cell list is updated based on the information on the at least one neighbor cell, and
wherein a number of neighbor cells included in the updated at least one neighbor cell list is less than or equal to a threshold number.

10. A management server in a wireless communication system, the management server comprising:
a transceiver configured to transmit or receive a signal; and
at least one processor coupled with the transceiver and configured to:
receive, from a first base station, a cell identifier and an operation frequency band of the first base station,
receive, from at least one second base station connected to the management server, a cell identifier and an operation frequency band of the at least one second base station, and
transmit, to the first base station, information on at least one neighbor cell for the first base station, at least one neighbor cell list included in the information on the at least one neighbor cell comprising the cell identifier and the operating frequency band of the at least one second base station,
wherein the operation frequency band of the first base station is identified from an available frequency band of a shared spectrum, the available frequency band including at least one frequency band which is accessible by the first base station with a priority,
wherein the operation frequency band is identified based on a frequency assignment mode of the first base station and a channel quality measured for each of the at least one frequency band,
wherein the frequency assignment mode of the first base station includes a first mode applying a weight value based on a received signal strength indicator (RSSI) value for reducing interference from other cell, a second mode applying a weight value based on a reference signal received power (RSRP) value for performing a handover without changing frequency band, and a third mode applying different weight values based on a combination ratio of the first mode and the second mode,
wherein, based on the first mode, the operation frequency band of the first base station is a frequency band with a lowest RSSI value,
wherein, based on the second mode, the operation frequency band of the first base station is a frequency band of a neighbor cell with a highest RSRP value in the at least one neighbor cell list, and
wherein, based on the third mode, the operation frequency band of the first base station is a frequency band corresponding to a largest one of the RSSI value or the RSRP value multiplied by the different weight values based on the combination ratio,
wherein the at least one neighbor cell list is updated based on the information on the at least one neighbor cell, and
wherein a number of neighbor cells included in the updated at least one neighbor cell list is less than or equal to a threshold number.

* * * * *